Sept. 5, 1939.  J. S. BEGGS  2,172,237
REMOVABLE CAMERA BED AND ATTACHING MEANS THEREFOR
Filed March 1, 1938
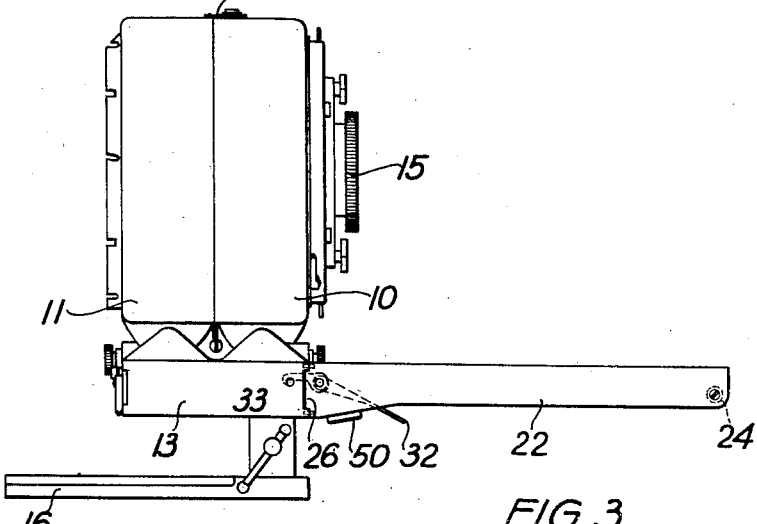
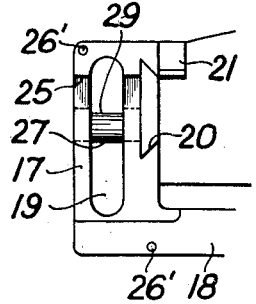
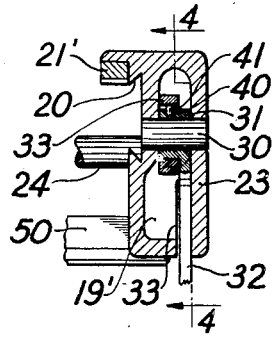
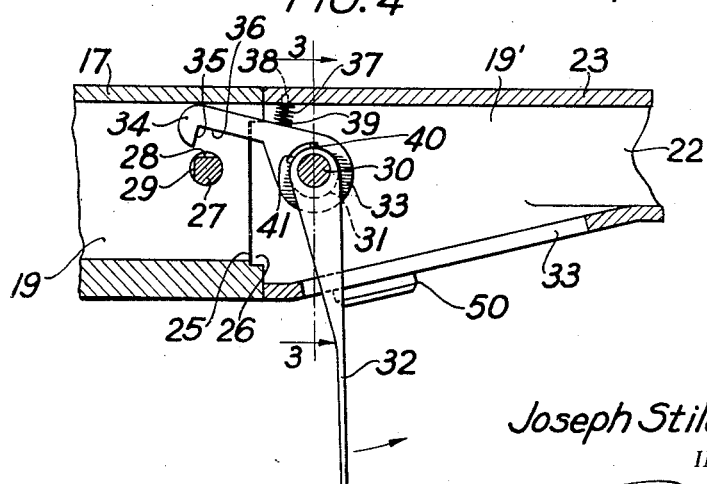
Joseph Stiles Beggs
INVENTOR
BY
ATTORNEYS Patented Sept. 5, 1939

2,172,237

UNITED STATES PATENT OFFICE 2,172,237

REMOVABLE CAMERA BED AND ATTACHING MEANS THEREFOR

Joseph Stiles Beggs, Rochester, N. Y., assignor to Eastman Kodak Company, Rochester, N. Y., a corporation of New Jersey Application March 1, 1938, Serial No. 193,304

5 Claims. (Cl. 95—39)

The present invention relates to beds for view cameras which include a stationary bed member and a removable bed member adapted to be positioned and held in endwise abutment to form the complete bed, and particularly to the means for clamping the two bed members rigidly in endwise abutment.

One problem which has always confronted camera designers working on view cameras is the provision of a suitable attaching means by means of which a removable bed section could be attached to the stationary bed section in endwise abutment so as to provide a complete bed, along which the camera front is moved relative to the camera back and in focusing, which has the rigidity of a bed formed from a single section. Although many different forms of attaching means for this purpose have been advanced, none has solved the problem to a degree where the bed formed of two abutted sections has the rigidity of a single section.

Therefore, one object of the present invention is the provision of a fastening means for attaching a removable bed member to a stationary bed member in endwise abutment whereby the complete bed has the rigidity of a bed made from a single member. Another object is the provision of a removable bed and attaching means therefor which can be operated by the fingers that are holding the removable bed in endwise position relative to the stationary bed member. And still another object is the provision of an attaching means for a removable bed which is adapted, in addition to positively holding the two bed members against separation, to pull the two members into tight endwise relation when moved to its clamping position. A further object is the provision of an attaching means for a movable bed which is easy to operate, requiring only a partial rotation of the actuating lever, simple and cheap in construction, and efficient and positive in its operation.

Briefly, my removable bed and attaching means therefor includes pivotally and eccentrically mounting a hook member on the removable bed so that it is adapted to extend beyond the end thereof and overhang a pin fixed to the stationary member of the bed. By rotating the eccentric on which the hook is mounted, the hook is first moved to a position where it engages the pin after which added movement of the eccentric causes the hook to draw the removable bed member into tight endwise engagement with the stationary bed member.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawing in which, Fig. 1 is a side elevation of a view camera, and showing my removable bed member attached to the stationary bed member and clamped thereto, Fig. 2 is an enlarged partial end elevation of the stationary bed member, Fig. 3 is an enlarged section taken substantially on line 3—3 of Fig. 4, and Fig. 4 is an enlarged side view of that portion of the bed where the stationary and removable bed members are in abutment, and taken substantially on line 4—4 of Fig. 3 showing the attaching and clamping means in its released position.

Like reference characters refer to corresponding parts throughout the drawing.

Referring now to Fig. 1, a conventional view camera is shown as comprising a front part 10, and a rear part 11, which are movably mounted on the stationary bed member 13 to be moved relative to one another for focusing purposes. The front and rear camera parts 10 and 11 are connected by a bellows in the conventional manner, and as shown, the camera parts take the form of housings which when moved to their collapsed position, as shown, completely enclose the bellows connecting the two parts. When the camera parts are moved to their collapsed position they may be held together by any suitable catch, indicated generally as 14. The rear camera part 11 is adapted to carry the conventional focusing ground glass and plate holder on its rear face, not shown; and the camera front 10 carries the usual lens mount 15 which may be attached thereto in any suitable manner. The stationary bed member 13 may be adjustably mounted on a base plate 16 which in turn may be fastened to the top of a tripod. The camera and associated structure above described is well known in the art and forms no part of the present invention.

Coming now to the structural details which lend themselves to and form part of my invention, it will be noticed, by referring to Fig. 1, that I have chosen to make the stationary bed member 13 of two side frames 17, one of which is shown in Fig. 2, which are spaced and held apart by a cross member 18. These side frames may be made of any suitable material, although I have found metal most desirable, and they are each provided with an opening 19 extending longitudinally therethrough. These openings 19 while serving to allow the attaching means for the removable bed to be concealed, as will be hereinafter described, also serve to lighten the structure. The inner face of each side frame is provided wtih a groove 20 which extends longitudinally thereof and in which complementary guide members on the camera are slidably mounted to provide for a sliding movement between the camera and the bed. A rack 21 is also mounted along the inside face of the side frame to be engaged by a rotatable pinion carried by the camera front whereby the camera front may be moved along the bed in the customary manner for focusing purpose.

The removable bed member 22 is made up of two side members 23 spaced apart by a brace 50 and a rod 24. The side members 23 are each provided with an opening 19', complementary to opening 19 in side frame 17 and extending longitudinally therethrough, a guide groove 20, and a rack 21', each of said enumerated parts being complementary in shape with those carried by the side frames of the stationary bed member to form an extended bed when abutted therewith along which the camera front can be moved as though the bed were formed from a single member.

The end of each side frame 17 is provided with a notch or key way 25 into which a projection or key 26 formed on the end of each side member 23 of the removable bed member is adapted to fit when the parts are in abutment. To aid in locating the removable bed 22 in proper abutment with the stationary bed member 13, each of the side frames 17 of the stationary bed member is provided with two pins 26' projecting from the end thereof and located at diagonally opposite corners, and which are adapted to extend into holes suitably located in the ends of the side members 23 of the removable bed 22. It will be readily understood that transverse movement of one bed member relative to the other will be prevented by the combined action of the locating pins 26' and the engagement of the key 26 on one member with the key way 25 on the other member when the two are held in endwise abutment.

For holding and drawing the stationary bed member 13 and the removable bed member 22 into tight endwise abutment, the following attaching means is provided. Fixed to the side frame 17 of the stationary member 13 and extending across the opening 19 therethrough is a pin 27 having a flat 28 on the top side and a flat 29 on the rear side. Fixed to each of the side members 23 and extending across the opening 19' extending therethrough is a pin 30. Rotatably mounted on this pin 30 is an eccentric 31 integral with and suspended from which is an actuating lever 32. This actuating lever extends through an elongated opening 33 in the bottom of the side member 23 so that the eccentric can be oscillated by moving the same.

The hook member 33 is loosely mounted on the eccentric 31 so as to allow a relative rotation between the two during the first part of the movement of the actuating lever to its clamping position, after which the last part of the movement of the actuating lever toward its clamping position, indicated by the arrow in Fig. 4, causes the eccentric to pull the hook member longitudinally of the bed whereby the two bed members are pulled tightly into endwise abutment, as will be hereinafter fully described. The nose 34 of the hook member extends beyond the end of the side members 23 to overhang the pin 27 fixed to the side frame 17 of the stationary bed 13 when the two bed members are in abutment, and said hook is provided with flat faces 35 and 36 which properly engage the flats on pin 27 when engaging the same. The hook member 33 is normally moved to its pin engaging position by the coil spring 37 positioned on a pin 38 on the side frame 23 and a pin 39 on the hook member. The action of the spring 37 is overcome to disengage the hook member 33 from the pin 27 when the pin 40 on the eccentric 31 reaches the end of the arcuate slot 41 in the hook member into which it extends. Inasmuch as the hook member 33 is normally moved to its pin engaging position by the spring 37, the arcuate slot 41 is of such a length that the pin 40 on the eccentric does not engage or move the hook when the actuating lever is moved to its clamping position. Due to the weight of the hook member and the pressure of the spring 37 there will be a certain amount of friction between the hook member and the eccentric 31 so that the initial movement of the eccentric to its clamping position will carry the hook member along to its hook engaging position after which further movement of the eccentric will cause the hook to pull on the pin 27. Should the spring 37, therefore, fail to serve its purpose, the hook member will be moved to its pin engaging position through the friction between the hook member 33 and the eccentric 31

From the above description, the operation of the removable bed attaching means will be obvious to those skilled in the art. When the removable bed 22 is to be connected to the stationary bed 13, one side member 23 thereof is gripped in either hand and the actuating lever members 32 are moved by the fingers to their release position, as shown in Fig. 4, wherein the pin 40 on the eccentric 31 engages the end of the arcuate slot 41 in the hook member and moves said hook member to its release position against the spring 37. Holding the actuating lever 32 in this position, the removable bed member 22 is abutted end for end with the stationary bed member 13, as shown in Figs. 1 and 4. The actuating levers 32 are now released and the spring 37 moves the hook member 33 downward until the nose thereof engages the pin 27. The loose connection between the hook member and the eccentric allows sufficient relative rotation between the two to permit the spring to move the hook to its pin engaging position without moving the actuating lever 32. Now the actuating levers 32 are moved in the direction indicated by the arrow, to their clamping position, shown in Fig. 1, and near the end of their stroke the throw of the eccentric 31 picks up the hook member and induces a pull thereon in a direction longitudinally of the bed to pull the two bed members 13 and 22 tightly into endwise abutment.

While I have shown a removable bed attached to only one end of the stationary bed member, it is obvious that a removable bed can be attached to the other end of the stationary bed in the same manner to allow for movement of the camera back, for instance where long camera extensions may be required. Further, it may be desirable to move both the camera front and the camera back relative to one another to obtain a given camera extension, and thereby eliminate the necessity of moving one camera part to the extreme end of the removable bed where a damaging leverage might be set up in the joint between the movable bed and the stationary bed. With my structure, in addition to a positive connection between the removable bed member and the stationary bed member, which would be induced by the hook engaging the pin, an additional clamping action is obtained when the hook is pulled longitudinally of the bed by the eccentric. It is the effect of this pulling action which gives an abutting joint which is more rigid than other joints heretofore provided for removable bed structures.

Although I have shown and described a certain specific embodiment of my invention, I am fully aware that many modifications thereof are possible. My invention, therefore, is not to be restricted except insofar as is necessitated by the prior art and the spirit of the appended claims.

I claim:

1. A clamp for holding and drawing two camera bed members in abutting relation, and comprising a pin fixed to one of said bed members and located adjacent the end thereof, a catch member pivotally mounted on the second bed member adjacent the end thereof to overhang said pin when the bed members are in abutment, and movable between a pin engaging position and a pin releasing position, and an actuating member pivotally mounted on said second bed member and connected to said catch member for moving the same between its two positions, the connection between said actuating member and catch member including an eccentric which acts to draw the two bed members into abutment after the catch has been moved to its pin engaging position.

2. A clamp for holding and drawing two hollow camera bed members in abutting relation, one of said bed members having a key on its end, and the other having a keyway in its end for receiving said key when the members are abutted end for end, said clamp comprising a pin fixed to one bed member and extending across the opening therethrough, a hook member oscillatably mounted within the second bed member to extend beyond the end thereof to overhang said pin when the two members are in endwise abutment, and movable between a pin engaging and a pin releasing position, an actuating member connected to the hook member for moving the same between its two positions, the connection between said actuating member and the said hook member including an eccentric which causes the hook member to draw the pin longitudinally of the bed members whereby said key is pulled endwise into said keyway.

3. A clamp for holding and drawing two camera bed members in abutting relation, and comprising a pin fixed to one of said bed members and located adjacent the end thereof, an eccentric oscillatably mounted on the second bed member and extending transversely thereof so that its throw will act longitudinally of the bed member, a hook member loosely mounted on the eccentric to be capable of limited rotation relative thereto, and adapted to overhang said pin when the bed members are abutted end for end, means normally forcing said hook into engaging position relative to said pin, and an actuating member for rotating said eccentric whereby said hook is moved longitudinally of said bed members to pull the same relative to one another into endwise abutment.

4. A clamp for holding and drawing two camera bed members in abutting relation, and comprising a pin fixed to one of said bed members and located adjacent the end thereof, a stud fixed to the second bed member and extending transversely thereof, an eccentric oscillatably mounted on said stud so that its throw acts longitudinally of the bed member on which it is mounted, a hook member loosely mounted on said eccentric and capable of partial rotation relative thereto, said hook member adapted to overhang the pin on the other bed member when said bed members are abutted end for end, resilient means normally forcing said hook member into a pin engaging position, a lost motion connection between said hook member and said eccentric, whereby the hook member can be raised to its pin releasing position against the action of said resilient means when the eccentric is oscillated in one direction, and can move to its pin engaging position independent of said eccentric after the same is oscillated in the other direction, and an actuating lever connected to said eccentric for oscillating the same, and rotatable between a release position, wherein the hook member is moved to disengage the pin, and a clamping position, wherein said hook member is pulled longitudinally of said bed members to draw the same relative to one another endwise.

5. A clamp for holding and drawing two camera bed members in abutting relation, and comprising a pin fixed to one of said bed members and located adjacent the end thereof, a stud fixed to the second bed member and extending transversely thereof, an actuating member oscillatably mounted on said stud to move between a release and a clamping position, said actuating member including an eccentric extending longitudinally of said stud and mounted thereon so that its throw acts longitudinally of the bed member on which it is mounted, a hook member loosely mounted on said eccentric to be capable of partial rotation relative thereto, said hook member adapted to overhang said pin when said bed members are abutted end for end, a coil spring situated between said hook member and one wall of said second bed member and normally forcing said hook member into its pin engaging position, and a pin and slot connection between said hook member and said eccentric, whereby the hook member can be raised to its pin releasing position against the action of said coil spring when the eccentric is oscillated by said actuating member in moving to its release position, and whereby said hook member can move to its pin engaging position under the action of said coil spring after, and only after, said actuating member is moved toward its clamping position.

JOSEPH STILES BEGGS.